United States Patent
Gudai et al.

(10) Patent No.: US 11,954,706 B2
(45) Date of Patent: *Apr. 9, 2024

(54) ONLINE PLATFORM FOR OUT OF HOME ADVERTISING

(71) Applicant: Adomni Inc., Las Vegas, NV (US)

(72) Inventors: Jonathan Gudai, Las Vegas, NV (US); Jonathan Fine, Las Vegas, NV (US); Robert Stockham, Las Vegas, NV (US); Christopher Weiss, Las Vegas, NV (US); Eric Medlin, Las Vegas, NV (US)

(73) Assignee: ADOMNI INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,247

(22) Filed: Nov. 22, 2022

(65) Prior Publication Data

US 2023/0196407 A1    Jun. 22, 2023

Related U.S. Application Data

(63) Continuation of application No. 16/571,571, filed on Sep. 16, 2019, now Pat. No. 11,514,474.

(60) Provisional application No. 62/732,255, filed on Sep. 17, 2018.

(51) Int. Cl.
*G06Q 30/02* (2023.01)
*G06F 16/9535* (2019.01)
*G06Q 30/0241* (2023.01)
*G06Q 30/0251* (2023.01)

(52) U.S. Cl.
CPC ..... *G06Q 30/0255* (2013.01); *G06F 16/9535* (2019.01); *G06Q 30/0277* (2013.01)

(58) Field of Classification Search
CPC ................. G06Q 30/02–0277; G06F 16/9535
See application file for complete search history.

(56) References Cited

U.S. PATENT DOCUMENTS

| 8,862,500 | B1 | 10/2014 | Mayfield |
| 2014/0149221 | A1 | 5/2014 | Rycyna |
| 2014/0337137 | A1 | 11/2014 | Roberston |
| 2018/0330403 | A1 | 11/2018 | Olivieri |

FOREIGN PATENT DOCUMENTS

| AU | 2011204927 A1 | 8/2011 |
| WO | 2020166693 A1 | 8/2020 |

*Primary Examiner* — Raquel Alvarez
(74) *Attorney, Agent, or Firm* — Perkins Coie LLP

(57) ABSTRACT

The present disclosure relates to an online platform for out of home advertising. The online platform may allow various advertisers to search for advertising panels (e.g., digital billboards), select available time periods for an advertising panel, upload an advertisement ("ad"), and have the ad displayed on the advertising panel. An advertiser can search for advertising panels using one or more search parameters (e.g., geographical location and demography of target audience). The online platform may also allow advertising panel owners to publish their advertising panels, manage availability, and approve or reject ads for display. The online platform may generate reports relating to the advertising panels.

20 Claims, 18 Drawing Sheets

Section: AD PLAYS/PRICING

Ad Plays / Pricing
Minutes Per Loop
1

Ad Duration in Seconds
5    Manage

Slots/Loop*®
12    Manage Slots

Slots for Adsense*
0

Expected monthly revenue per slot*
$ 0.00

Allow purchasing via campaign?
No

Pricing Adjustment Periods Add Time Period
Pricing Instructions above PGP

Type          Start          End          Details

FIGURE 6C

FIGURE 6D

ONLINE PLATFORM FOR OUT OF HOME ADVERTISING

CROSS REFERENCE TO RELATED APPLICATION

The present application is a continuation of U.S. patent application Ser. No. 16/571,571, titled "ONLINE PLATFORM FOR OUT OF HOME ADVERTISING," and filed Sep. 16, 2019, which claims priority to U.S. Provisional Patent Application No. 62/732,255, titled "ONLINE PLATFORM FOR OUT OF HOME ADVERTISING," and filed Sep. 17, 2018, which are incorporated by reference in their entirety.

TECHNICAL FIELD

This disclosure generally relates to advertising, and more particularly, to an online platform for displaying advertisements on out of home advertising mediums.

BACKGROUND

Marketing materials may be displayed to the public in various forms of advertisement. One such type of advertising can include out of home (OOH) advertising, which may refer to advertising that occurs outside of the home of a consumer. An example of OOH advertising medium can include a billboard displayed to consumers in an environment. Examples of suitable environments for OOH advertising can include a restaurant, a convenience store, a medical facility, etc.

In many cases, an advertiser may take multiple steps to display specific marketing materials in an OOH advertising environment. Examples of such steps can include the advertiser identifying an available billboard, determining the owner of the billboard, contacting the billboard owner, get pricing and availability of the billboard, negotiate with the billboard owner, receive a contract from the billboard owner, review the contract, receive an invoice, make payment, send the advertising content and display schedule of the advertising content, and request various performance reports. Performing these steps for OOH advertising can be time consuming and inefficient for both the advertiser and the owner of the OOH advertising medium (e.g., the billboard owner).

Further, the likelihood of the advertiser not finding a suitable OOH advertising medium may be great, as the advertiser may be unaware of potentially suitable OOH advertising mediums, particularly if the advertiser is located far from the OOH advertising medium. Additionally, owners of the OOH advertising medium may be unable to identify and attract advertisers to display their marketing materials on OOH advertising medium of the owner. Consequently, time slots available for the OOH advertising medium may go unsold.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

FIG. 4G is a screenshot of a checkout GUI for completing a booking of the advertising panel, in accordance with various embodiments.

FIG. 5B is a screenshot of the approval GUI, in accordance with various embodiments.

FIG. 6C is a screenshot of another advertising panel settings GUI, in accordance with various embodiments.

FIG. 6D is a screenshot of another advertising panel settings GUI, in accordance with various embodiments.

Figure 1:
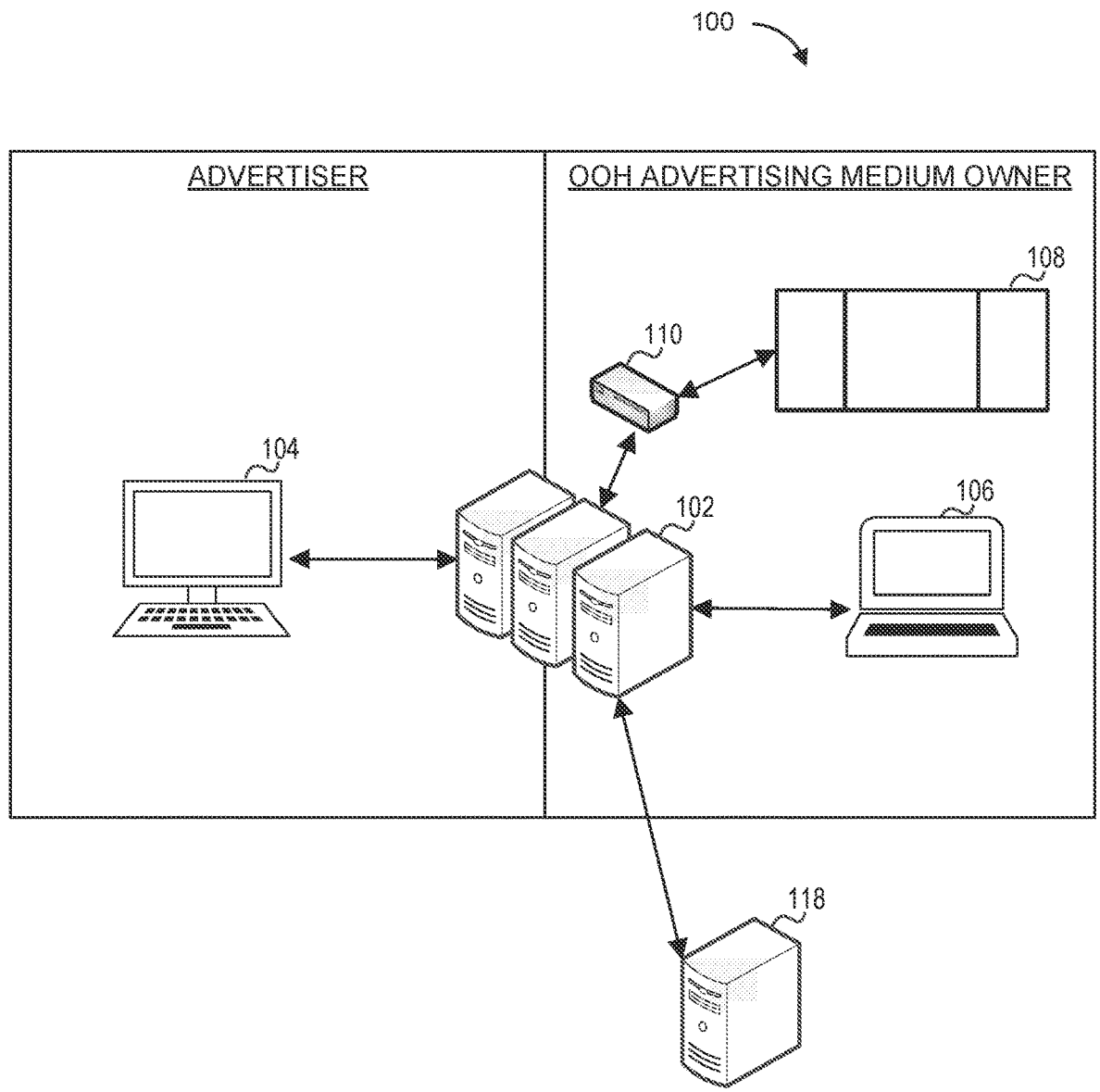
FIG. 1 is a block diagram of an environment for implementing an online platform, in accordance with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to implement an online platform configured display selected advertiser content on out of home (OOH) advertising mediums.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

OVERVIEW

Advertisements can be displayed to consumers using various mediums. One subset of mediums can include out of home (OOH) advertising mediums. Example OOH advertising mediums can include an electronic panel, billboard, etc., displayed in a publicly-accessible environment. Examples of suitable environments for OOH advertising can include a restaurant, a convenience store, a medical facility, etc.

In many cases, an advertiser may manually perform multiple steps to display specific marketing materials in an OOH advertising environment. However, performing these steps for OOH advertising can be time consuming and inefficient for both the advertiser and the owner of the OOH advertising medium (e.g., the billboard owner).

Further, the likelihood of the advertiser not finding a suitable OOH advertising medium may be great, as the advertiser may be unaware of potentially suitable OOH advertising mediums, particularly if the advertiser is located far from the OOH advertising medium. Additionally, owners of the OOH advertising medium may be unable to identify and attract advertisers to display their marketing materials on OOH advertising medium of the owner. Consequently, time slots available for the OOH advertising medium may go unsold.

In many cases, advertisers may search a computer network (e.g., the internet) for websites containing information relating to various OOH advertising mediums. However, the advertiser may be unable to find such information without multiple search queries. This may lead to inefficient use of computational and network resources.

The present embodiments relate to an online platform facilitating the selection of out of home advertising mediums. The online platform may allow advertisers to search for OOH advertising mediums (or advertising panels), reserve an advertising panel, upload an advertisement (or "ad"), and have the ad displayed on the advertising panel. An advertising panel can be a digital screen-based panel or a non-digital screen-based panel. An advertiser can search for advertising panels using one or more search parameters, such as, for example, geographical location of the panel and a set of demographics of a target audience.

The online platform may allow advertising panel owners to publish their advertising panels to advertisers, manage availability of time slots, set a price for displaying an ad, approve or reject the ad for display on their advertising panel, and receive payment for displaying the ad. The online platform may generate report(s) for advertisers and/or advertising panel owners providing various information, such as a proof of play, a number of times an ad was displayed, a number of audience expected to have viewed the ad, a demography of the audience, an occupancy of the advertising panel, and financial information.

FIG. 1 is a block diagram of an environment 100 for implementing an online platform, in accordance with various embodiments. As shown in FIG. 1, a server 102 may implement an online platform. In some embodiments, the server 102 may include a network-accessible server system representing one or more interconnected computing devices configured to process information and transmit information between the interconnected servers.

An advertiser may interact with the online platform via a network-accessible device (e.g., computer 104). For example, an advertiser on the advertiser device (e.g., computer 104) may access the online platform by connecting to the server 102 via a network (e.g., the internet).

An advertiser may access the online platform to select one or more OOH advertising mediums to display ads associated with the advertiser. Particularly, the advertiser may view a plurality of potential OOH advertising mediums (e.g., advertising panels, electronic billboards) and information relating to each potential OOH advertising medium. The advertiser may select one or more OOH advertising mediums to have an advertisement displayed on the selected OOH advertising mediums.

In addition, a plurality of OOH advertising medium owners (or "panel owners") may access the online platform via a device (e.g., laptop 106). The OOH advertising medium owner may be an authorized entity that owns/controls the advertisements on a OOH advertising medium. For example, the OOH advertising medium owner may own an electronic panel (e.g., panel 108), and the OOH advertising medium owner can offer available time slots to have advertisements display on the panel 108 at the time slots. The panel 108 may be controlled by a panel control module 110.

A panel control module 110 may obtain one or more ads from server 102 and renders the ads on the panel 108. The panel control module 110 may support rendering of multiple types of media on the panel 108, such as images, video, audio, animations, etc. As discussed below, the panel control module 110 may display ads on the panel 108 at specified time periods.

The server 102 may store various data associated with the online platform, such as data associated with screen owners, advertising panels, advertisers, and ads. The various entities in the environment 100 may communicate with one another over a communication network, such as the Internet, a local area network (LAN), a wide area network (WAN), etc.

The online platform can be implemented in various configurations. For example, in a first configuration, the online platform can be implemented as a website hosted by the server 102. The website can be used by the advertisers (e.g., using their client devices 104, for searching for the advertising panels 108 and submitting their ads for display on the advertising panels. The website can be used by the screen owners (e.g., using owner device 106) to manage advertising panels. Managing advertising panels on the online platform can include any of registering an advertising panel with the online platform for making it available for advertisers, providing various details of the advertising panel, setting the price for displaying an ad, setting the availability schedule, etc.

In another configuration, at least a portion of the online platform can be implemented as an application executing on a client device (e.g., client device 104 and/or client device 106. The application can communicate with the server 102 to perform various functionalities of the online platform. Client devices 104, 106 can be any network-enabled computing device, such as a desktop, a laptop, a smartphone, a tablet, a wearable device, etc.

In some embodiments, the server 102 may communicate with a third-party server 112. Third party server(s) 112 may provide various information to be used with the online platform, as discussed in greater detail below.

Figure 2:
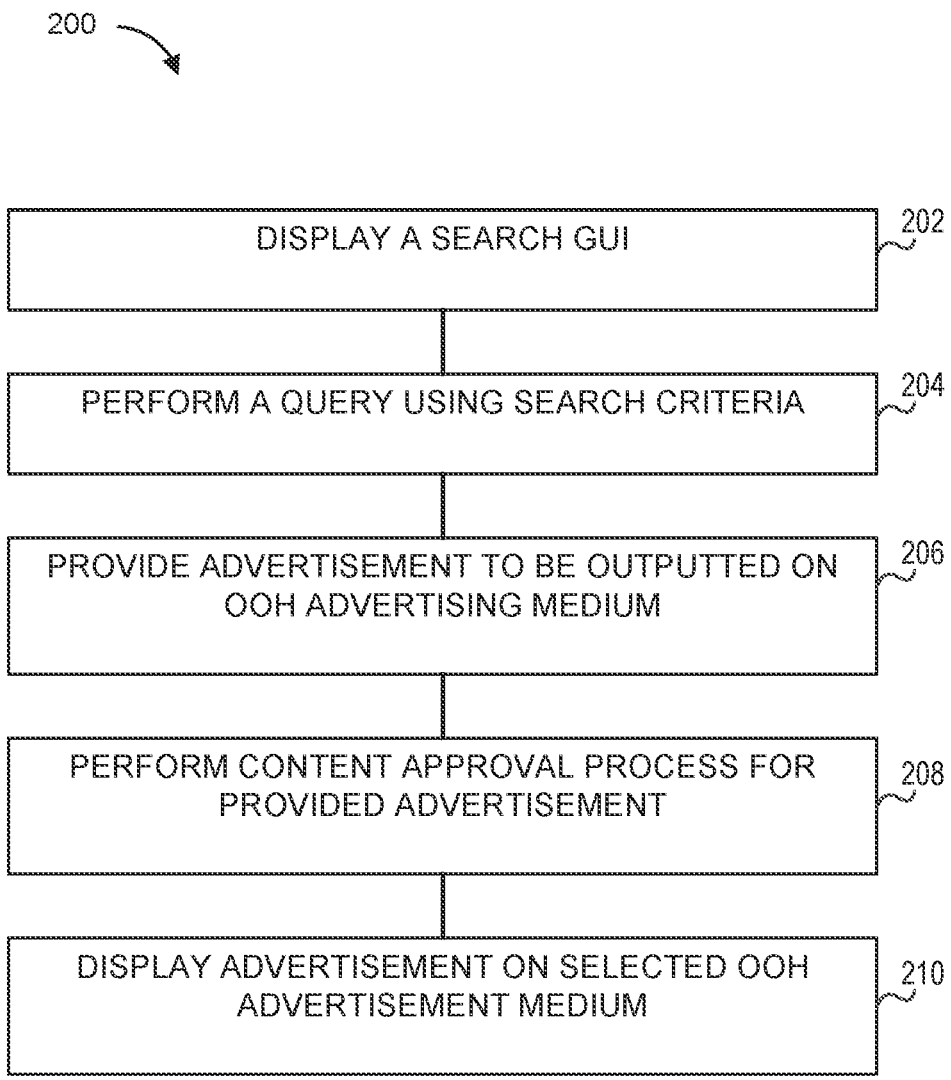
FIG. 2 is a flow diagram illustrating a process to display marketing materials on a selected ooh advertising medium, in accordance with various embodiments.

FIG. 2 is a flow diagram illustrating a process 200 to display marketing materials on a selected OOH advertising medium, in accordance with various embodiments. As noted above, an online platform may facilitate the selection of an OOH advertising medium (e.g., panel) and display of marketing materials (e.g., an advertisement). The online platform may generate a display (or graphical user interface (GUI)) providing a plurality of potential OOH advertising mediums (block 202). An advertiser can search for potential OOH advertising mediums on the search GUI.

The search GUI may include a listing of potential OOH advertising mediums and information relating to each potential OOH advertising medium. Example information relating to each potential OOH advertising medium may include geographic information, panel ownership information, panel time slot availability information, price information, etc.

The search GUI may provide various search parameters that the advertiser can use to narrow the search for a group of advertising panels the advertiser is interested in. For example, a geographical location parameter may allow the advertiser to search for an advertising panel by a geographical location (e.g., street name, city, state, zip code). In another example, an advertising panel type parameter may allow the advertiser to search for an advertising panel by type (e.g., a digital billboard, an indoor advertising panel, a shopping mall advertising panel, a mobile display, a taxicab advertising panel, a bus stop advertising panel, a coffee shop advertising panel). In another example, a target audience parameter may allow the advertiser to search for an advertising panel by target audience (e.g., minimum number of target audience, income of target audience, ethnicity, gender, age group, or other such categories.

The advertiser may input a search criterion for finding the preferred advertising panels in a search GUI. The online platform may perform a query with the search criteria on the server and generate a list of advertising panels that satisfies the search criteria (block 204). The advertiser may select an advertising panel from the list and view additional information associated with the selected digital billboard. The online platform may provide a variety of advertising panel information, such as a location of the digital billboard, owner of the digital billboard, available time slots on the digital billboard, a price of an ad play on the digital billboard, an image of the digital billboard, a live video feed showing the digital billboard, a content type supported by the digital billboard, and a screen size of the digital billboard.

Responsive to the advertiser selecting a selected advertising panel, the advertiser may provide or identify the advertisement that is to be displayed on the selected advertising panel (block 206). After identifying a satisfactory advertising panel based on the advertiser search, the advertiser may input the ad that is to be displayed. The advertiser can upload the ad, which can be an existing ad of the advertiser or generated using a third party server or choose an ad from a content library in the online platform that may include ads associated with the advertiser. In some embodiments, the advertiser may design an ad using an online content creation tool of the server that may provide the necessary tools for designing the ad. The advertiser may also input scheduling information for displaying the ad in the digital billboard, such as a period (e.g., start date and end date, for which the ad should be displayed, any specific time of the day the ad should be displayed, and an ad delivery method.

In some embodiments, after selecting the digital billboard, uploading/designing the ad and inputting the ad details in the GUI, the advertiser can add the selected digital billboard to a shopping cart and complete a checkout process (e.g., the advertiser making the necessary payments for the advertisement). After the checkout process is successful, the server may send a notification (e.g., via email, to the screen owner associated with the digital billboard to review the ad).

The content included in the advertisement to be displayed on the selected OOH advertisement medium may be approved in a content review process (block 208). The screen owner can review the ad and approve or reject the ad for display on the digital billboard. The content approval process can include various criteria and can be automated and/or manual. For example, the server can automatically check whether the ad content type (e.g., image, video, or animated image, is compatible with the digital billboard, whether the content matches the display's settings for allowed content (e.g., video length in seconds to match the display's ad duration, height and width of the content for exact match or aspect ratio match). If one or more of the checks fail, the server may notify the advertiser accordingly. The notification to the advertiser can also include a reason for rejection and optionally, a solution to overcome the rejection.

The content review process may include detecting various objects/characteristics included in the advertisement and comparing the detected objects/characteristics against a set of rules associated with the panel owner. For example, a rule can indicate that no more than 7 words are to be included in an advertisement. In this example, the content review process can include identifying a number of words in an advertisement and determining whether the advertisement includes more than 7 words. The advertisement can be approved by the system when the advertisement satisfies all rules associated with the panel owner.

In some embodiments, a notification is also sent to an admin user associated with the online platform, and the admin user may also approve or reject the ad content for reasons that are the same or different as the screen owner. For example, the admin user may check the content against a set of content guidelines such as no alcohol, no competitive businesses, etc.

In some embodiments, the server sends the awaiting approval notification to the admin user prior to the screen owner. Further, the screen owner may be notified only if the ad is approved by the admin user. The screen owner may perform the same check as the admin user and/or any other checks they want to do and either approve or reject the content.

The panel control modules can perform various content processing (e.g., image processing, video processing and/or audio processing, in order to make the content suitable for being displayed on their corresponding advertising panels. For example, the panel control module may have a content stitching component that stitches different portions of the content uploaded by the advertiser into one content and display the content across multiple screens such that each screen displays a portion of the content.

In some embodiments, multiple advertising panels may be arranged such that each play one piece of content (e.g., taxi top screens). These screens may be sold as one unit, but on a vehicle, they may be 3 screens arranged in a triangle pattern. The two sides may be the same size and aspect ratio and the rear screen being a different size and aspect ratio. The panel control module that is configured to render the content on the screen may need one piece of content where the left side of the content gets played on the side screens and the right side of the content gets played on the rear screen. The left side of the content may need to have the aspect ratio changed and the end result of what the panel control module needs can be complicated. So, the online platform can request the advertiser to upload two pieces of content—one for the sides with the correct dimensions (e.g., height and width and type—image, video or animated image, and another piece of content for the rear. The panel control module can format (e.g., stitch, the two different pieces of content into one piece of content formatted the correct way) the content to fit correctly on the screens.

Another example of content processing includes breaking the content into multiple pieces so that each piece can be formatted accordingly to be displayed on one screen from a combination of screens. The panel control module can include a content scalpel component that performs the above processing. A content scalpel component, like a content stitch component, can make it easier for advertisers to submit content. Some advertising panels may need a piece of content to be broken up into different segments and placed in different coordinates (x,y) of the piece of content that gets played by the panel control module. For example, an advertising panel can be significantly wider compared to its height. It may be that the screen is actually 4 screens next to each other that looks like one screen and is just showing a piece of the content. The advertiser may provide one piece of content that is very wide but not very tall. The content scalpel component in the panel control module may split the content of a piece of content that is actually a square into 4 pieces and stack it on top of each other to accommodate all of the screens.

Responsive to the selected advertisement being approved, the advertisement may be displayed on the selected OOH advertisement medium at the predetermined time slot(s) (block 210). As an example, an image of the advertisement may be displayed on an electronic billboard periodically (e.g., for ten seconds, every ten minutes). A panel control module may process and render the advertisement to be displayed on the electronic billboard.

If the content is approved by the screen owner, the advertiser may be notified and the content will then be eligible to be displayed on the digital billboard. In some embodiments, if the advertiser purchases another campaign and use the same content on the same advertising panel the content may not need to be approved again. Upon the content being approved, the server transmits the approved content and the scheduling information to the panel control module associated with the digital billboard, which plays the ad according to the scheduling information.

Figure 3:
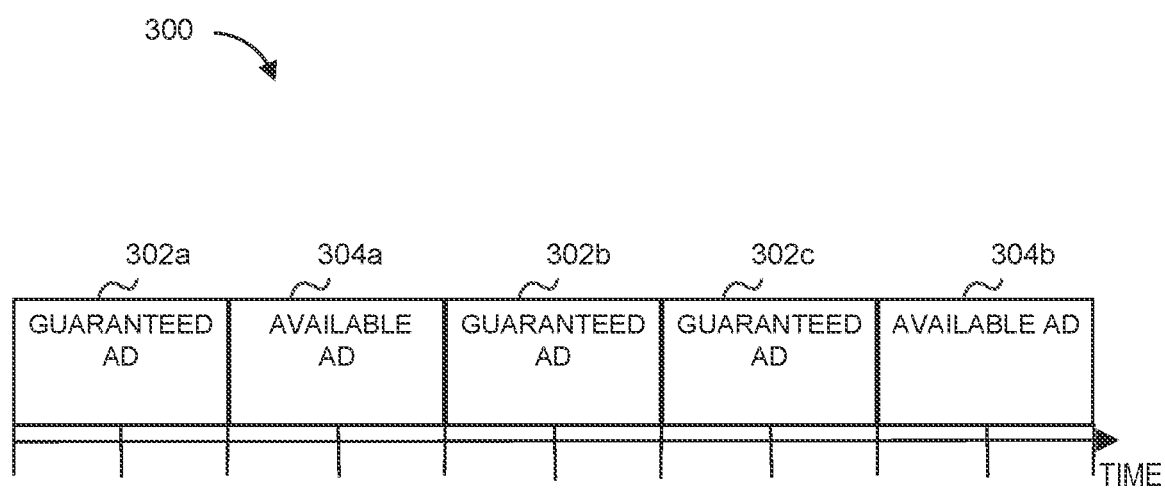
FIG. 3 is a block diagram for showing a series of advertisements on an ooh advertisement medium, in accordance with various embodiments.

FIG. 3 is a block diagram for showing a series of advertisements on an OOH advertisement medium, in accordance with various embodiments. As noted above, an OOH advertising medium can display multiple advertisements at various time slots. As an example, a panel control module can render and display advertisements at predetermined durations (e.g., every ten seconds, every minute).

In some embodiments, the display of an advertisement may be either 'guaranteed (e.g., blocks 302*a*-*c*)' or 'as available (e.g., block 304*a*-*b*).' In the guaranteed delivery method, the advertiser may select a specific number of time slots to display an advertisement.

Each time slot selected may correspond to an ad play (i.e., a unit of measurement of a time selected to display an advertisement). As an example, if the advertiser selects to display an advertisement at a frequency of "once every 4 minutes," the advertisement may be played once every 4 minutes on the OOH advertisement medium. Additionally, the guaranteed advertisement display method can translate to a number of ad plays in the specified period and a price of the ad play that the advertiser can buy. After the advertiser purchases the ad plays, the availability of the digital billboard may be updated on the online platform accordingly (e.g., the available ad plays for the panel is reduced by the number of ad plays bought the advertiser).

In the "if available" delivery method, the advertiser may input a specified budget for displaying the advertisement, and the online platform can identify available time slots on the selected OOH advertisement medium that are available within the budget. In some embodiments, the advertiser may get a better price in the if available delivery method compared to the guaranteed delivery method but the advertiser may also end up not getting any ad plays (e.g., if the inventory/time slots are not available for the digital billboard).

As shown in FIG. 3, a series of advertisements may be scheduled to be displayed during various time blocks. For example, guaranteed ad 302a can be scheduled to play for a first time block, and an available ad 304a can be scheduled to be played during a second time block.

In some embodiments, to minimize or the avoid a scenario where the advertiser 106 does not get any ad plays at all, the server may implement a weighted algorithm to determine when to play the ads in the if available delivery method. In the weighted algorithm, after all the screen owner content has been scheduled and the advertiser content sold in a guaranteed delivery method is scheduled for the advertising panel, the server examines the schedule for the whole day and determines if there are any available slots in the schedule. If there any slots available, the server may start assigning a weight to the advertisers who purchased the slots in "if available" delivery method and displays the ads according to the weight.

As an example, a screen owner may set up a digital billboard with a 1-minute loop and a 6 second ad duration (which is the maximum time any single ad can play). This may account for a total of 14,400 ad plays per day (24*60* (10 ad plays per minute)) for the digital billboard or 10 slots of 1,440 ad plays. The screen owner can keep 3 slots (that is, not make them available on the online platform) and schedule their content in those 3 slots. The other 7 slots can sold on the online platform. One of the advertisers can buy 2 slots with the guaranteed delivery method. This may leave 5 slots or 7,200 ad plays to be sold on an "if available" basis for that day. The server may distribute those 5 slots among the advertisers that bought on an if available basis. For example, the advertiser may buy 1,440 ad plays which equals 20% of the ad plays left, and a second advertiser bought 720 ad plays which equals 10% of the ad plays left. The advertiser may schedule 4 pieces of content and the second advertiser schedules 1 piece of content on the digital billboard. The server may assign a weight to the content of the advertiser as a function of the ad plays bought by the advertiser and the number of content. For example, the server divides the 20% among the 4 contents of the advertiser 106, which gives a weight of 5 to each of their content. Similarly, the server may assign a weight of 10 to the content of the second advertiser.

In this scenario, the server may have not sold enough time slots to fill the left-over ad plays. The server may take all the screen owner, advertiser guaranteed and advertiser if available content and fill the left-over percentage (70% in this scenario) using the same percent left-over number of pieces of content calculation to get the weights. The server may send the content and the weights of the content to a panel control module associated with the digital billboard. In some embodiments, the higher the weight the more chances for the content to be displayed. Each time an unscheduled ad play comes up on the digital billboard, the panel control module may randomly select a piece of content to play.

The server can adjust the algorithm at a specified time interval (e.g., every 1-5 minutes, depending on the advertising panel settings, by calculating what got played and adjusting the weights of all the content. In some embodiments, the adjustment is done to evenly distribute an if available budget throughout the day so that the advertisers don't get all their ad plays first thing in the morning and then none for the rest of the day. Also, if the server oversells an advertising panel, the server can use an equal percentage of the budget of each of the advertisers instead of some advertiser getting all their budget spent and some getting none of their budget spent.

In some embodiments, the weighting algorithm can be modified based on a variety of factors. The OOH advertising medium can be associated with a plurality of factors that impact the number of consumers that view the advertisement. Example factors include time of day, average consumers passing the panel, the size of the panel, etc. The weighting algorithm may give greater weight to providing advertisements during time slots that have more consumers viewing the panel. Accordingly, available time slots with more consumers viewing the panel may have a greater price than other time slots with less consumers viewing the panel. In some embodiments, the algorithm can also consider other factors in determining the weight (e.g., spreading budget across a network of screens, hours of operation, geofenced campaigns, estimated ad plays for a network like taxis where the number of ad plays per day are not known but estimated based on historical data).

In some embodiments, advertising panels on top of taxis or inside a vehicle may include global positioning system (GPS) data that can be made available to panel control modules. The panel control modules can show ads based on campaign schedule, budget, and a geofence location (either inside or outside the specified geofences). The server can use the above algorithm to determine the weight if a content of the advertiser wins the ad play and the panel control module can then check to make sure the advertising panel is within the specified geofence and show or skip the ad accordingly. Weighting for geofence content may have a higher chance of being displayed and the algorithm can use historical data to determine the weighting for the geofence selections.

Online Platform GUIs

FIGS. 4A-4G are example GUIs for searching for advertising panels and submitting ad content for displaying in a user selected advertising panel. The server may generate various GUIs that can be interacted with by a screen owner to register their advertising panel in the online platform. Once registered, the online platform may make the advertising panel available for the advertisers to display their ads. As part of the registration process, the screen owner can provide various details of the advertising panel, such as scheduler type, support level, start date, display type, size (e.g., in feet), number of faces, facing direction, advertising panel name, advertising panel ID, advertising panel location, hours of operation, description, height and width (e.g., in pixels), start player full screen, content type allowed, rotate content, additional content guidelines, and name of the entity who should approve ad content.

Below are example terminologies that may be used in managing an advertising panel. A first term may include loop, which may indicate a number of minutes to break a number of advertisements to be played in a sequence on the panel. Another term may be an ad duration, which may be a number of seconds a piece of content stays on the screen before switching to the next piece of content. In some embodiments, the ad duration may be evenly divisible by the number of seconds in the loop. For example, for a 2-minute loop length, the ad duration can be 5, 6, 7, 8, 10, 12, 15, 20, 24, 30, 40, 60, 120. Another term may be slots, which may indicate a loop length in seconds divided by the ad duration. For example, a 2-minute loop equals 120 seconds, with an ad duration of 6 seconds that gives 20 slots (120/6).

Figure 4A:
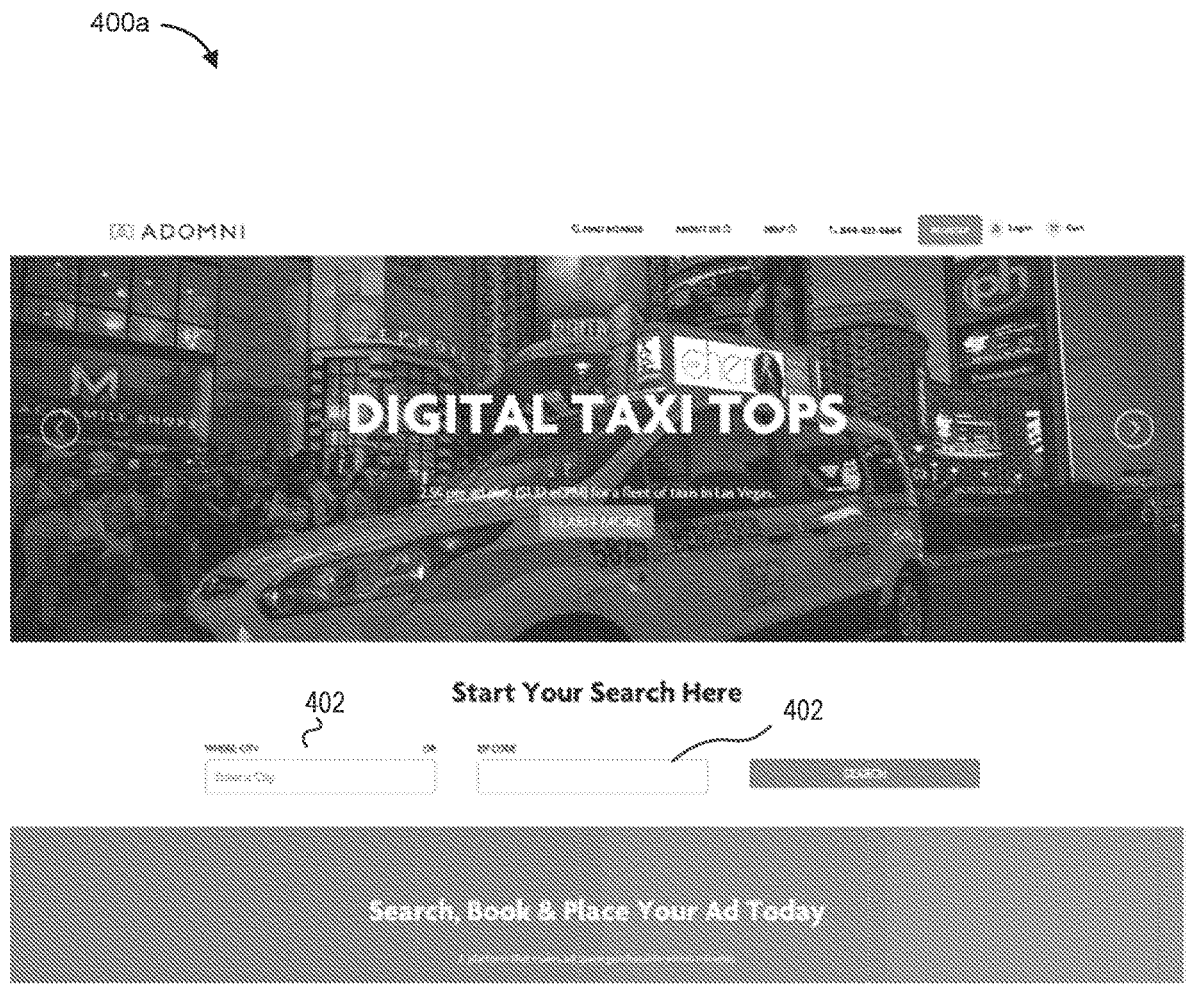
FIG. 4A is a screenshot of a search GUI for searching the online platform for advertising panels, in accordance with various embodiments.
Figure 4B:
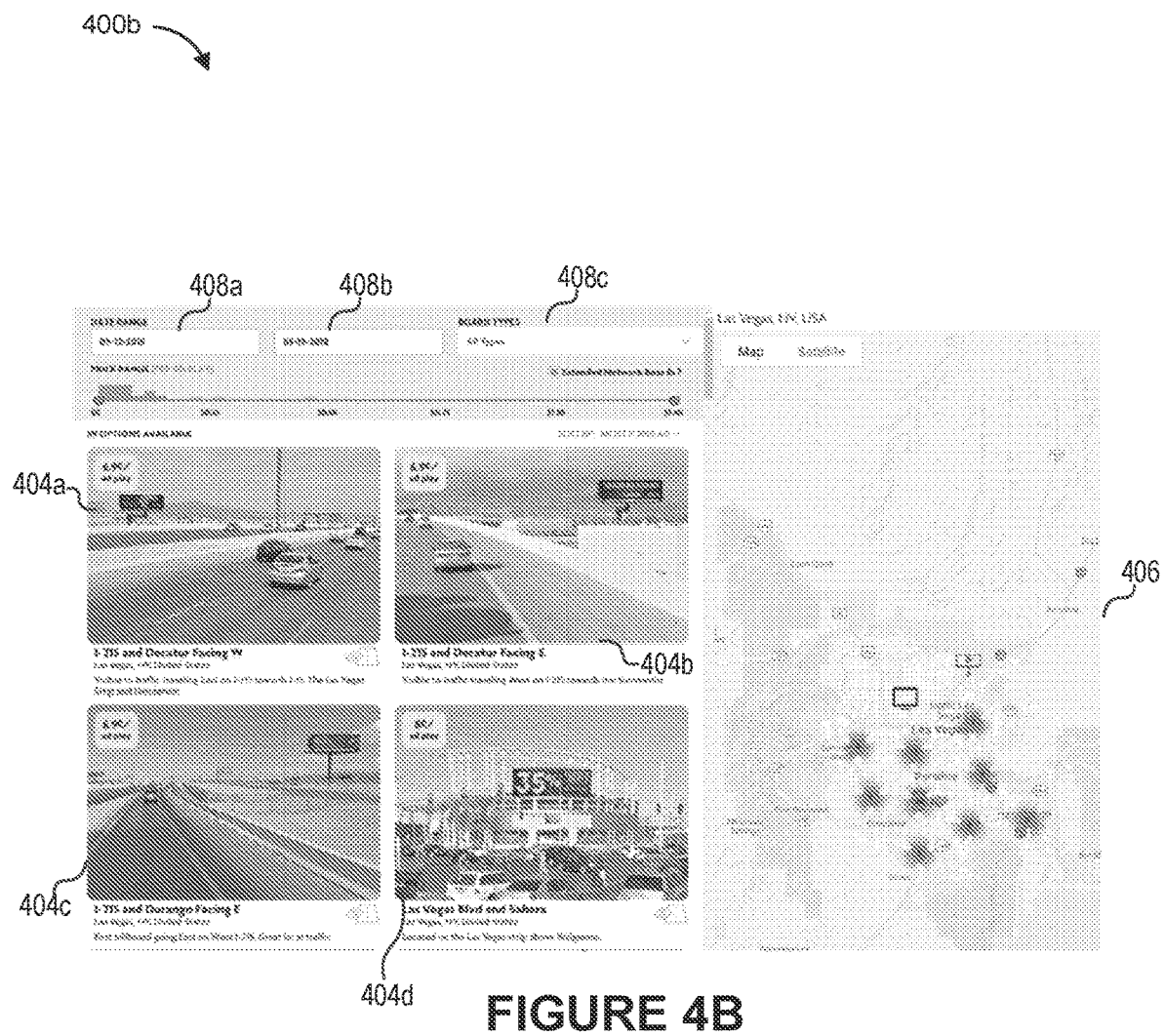
FIG. 4B is a screenshot of a search result GUI showing a search result having a list of advertising panels, in accordance with various embodiments.

FIG. 4A is a screenshot of a search GUI 400a used for searching the online platform for advertising panels, in accordance with various embodiments. In the search GUI, a user (e.g., the advertiser), can input search criteria 402, 402 such as a city or zip code of a location where the advertiser would like to search for advertising panels. For example, the advertiser 106 can input the city as Las Vegas, NV. However, any number of search criteria may be included in the search GUI 400a FIG. 4B is a screenshot of a search result GUI 400b showing a search result having a list of advertising panels, in accordance with various embodiments. In the search result GUI, the server may display information regarding a list of advertising panels that satisfies the search criteria. For example, four separate listings of potential advertising panels 404a-d may be displayed. The information in the search results can include an image of an advertising panel, cost per ad play for the advertising panel, and a location of the advertising panel. The search result GUI can also show a location of the advertising panels in the list using a map 406. Further, the search result GUI can also allow the advertiser to further update the search result by updating one or more search criterion 408a-c (e.g., type of advertising panel). The advertiser can select one of the advertising panels from the list (e.g., digital billboard), to view additional information associated with the selected advertising panel.

Figure 4C:
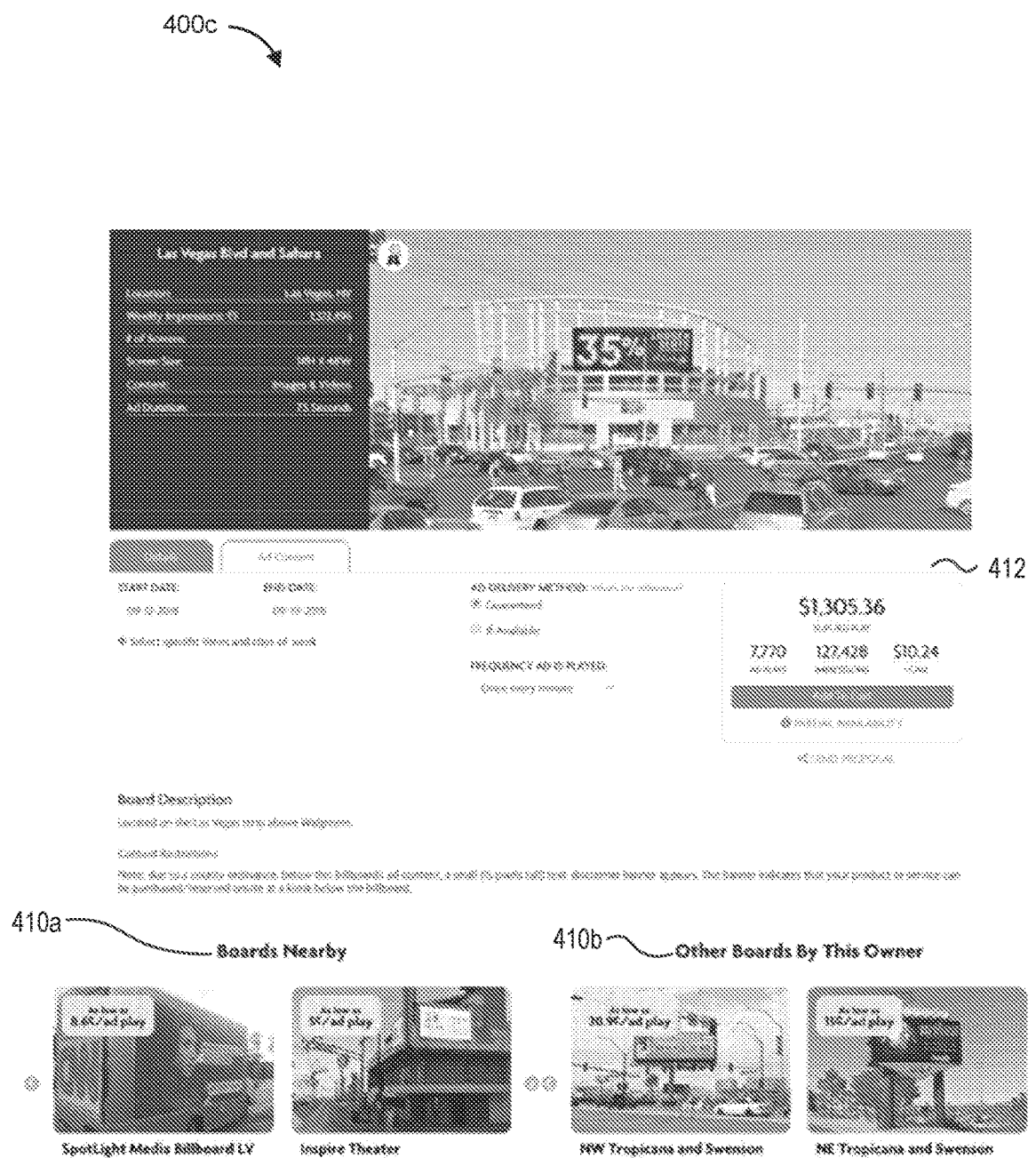
FIG. 4C is a screenshot of an advertising panel detail GUI showing information associated with an advertising panel selected from a search result, in accordance with various embodiments.

FIG. 4C is a screenshot of an advertising panel detail GUI 400c showing information associated with an advertising panel selected from a search result, in accordance with various embodiments. In the advertising panel detail GUI 400c, the advertiser can view additional information associated with the digital billboard, set or edit the scheduling information for the ad content the advertiser wants to be displayed on the digital billboard. The advertising panel detail GUI 400c can also show information regarding other associated advertising panels (e.g., advertising panels that are near by the digital billboard 410a, or that are owned by the screen owner of the digital billboard 410b). The advertising panel detail GUI 400c may also include detailed information relating to the selected panel 412, such as available dates, ad delivery method, frequency, price per ad play, number of ad plays, number of impressions, etc.

Figure 4D:
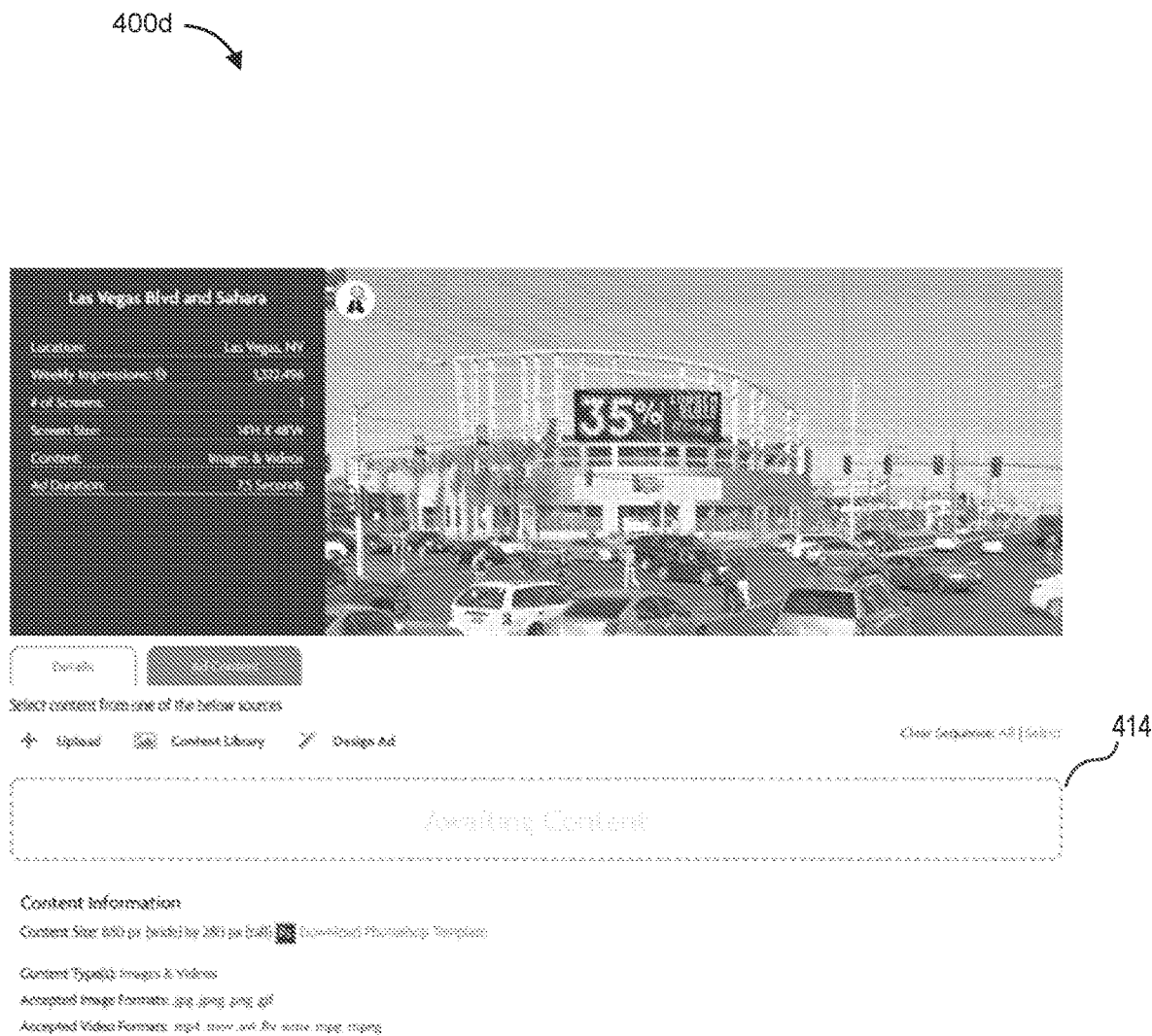
FIG. 4D is a screenshot of an upload GUI for uploading ad content, in accordance with various embodiments.

FIG. 4D is a screenshot of an upload GUI 400d for uploading ad content, consistent with various embodiments. In the upload GUI, the advertiser can upload the ad content to be displayed on the digital billboard in a content upload button 414. The advertiser can upload the content from one or sources, such as from the client device associated with the advertiser, or a cloud storage service. The ad content upload GUI can also display the types of ad content supported by the digital billboard.

Figure 4E:
FIG. 4E is a screenshot of a content library GUI for selecting the ad content from a content library, in accordance with various embodiments.

FIG. 4E is a screenshot of a content library GUI 400e for selecting the ad content from a content library, in accordance with various embodiments. Using the content library GUI, the advertiser can select ad content to be displayed on the digital billboard from a content library of the online platform. For example, the advertiser can select a first proposed ad content 416 to be displayed on the digital billboard. In some embodiments, the content library stores ad content previously used by the advertiser.

Figure 4F:
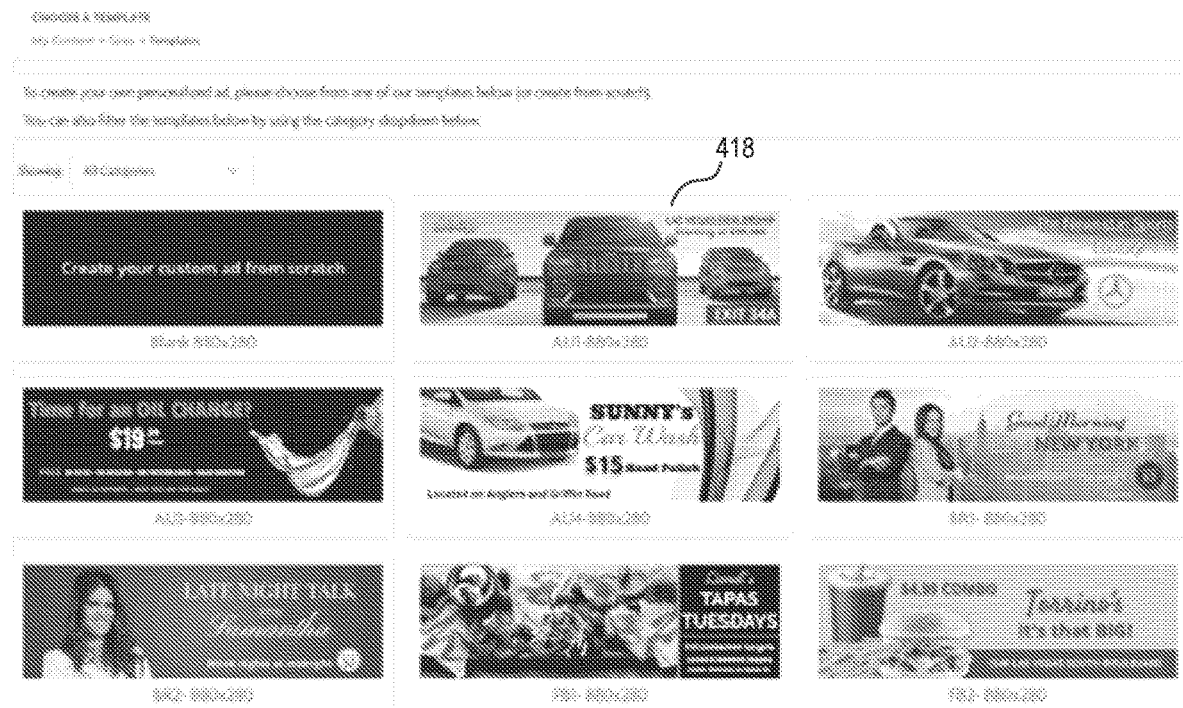
FIG. 4F is a screenshot of a content design GUI for designing ad content, in accordance with various embodiments.

FIG. 4F is a screenshot of a content design GUI 400f for designing ad content, in accordance with various embodiments. Using the content design GUI, the advertiser can design ad content by selecting an ad template (e.g., first template 418) and customizing the ad template to generate the ad content or designing the ad content from a blank template.

Figure 4G:
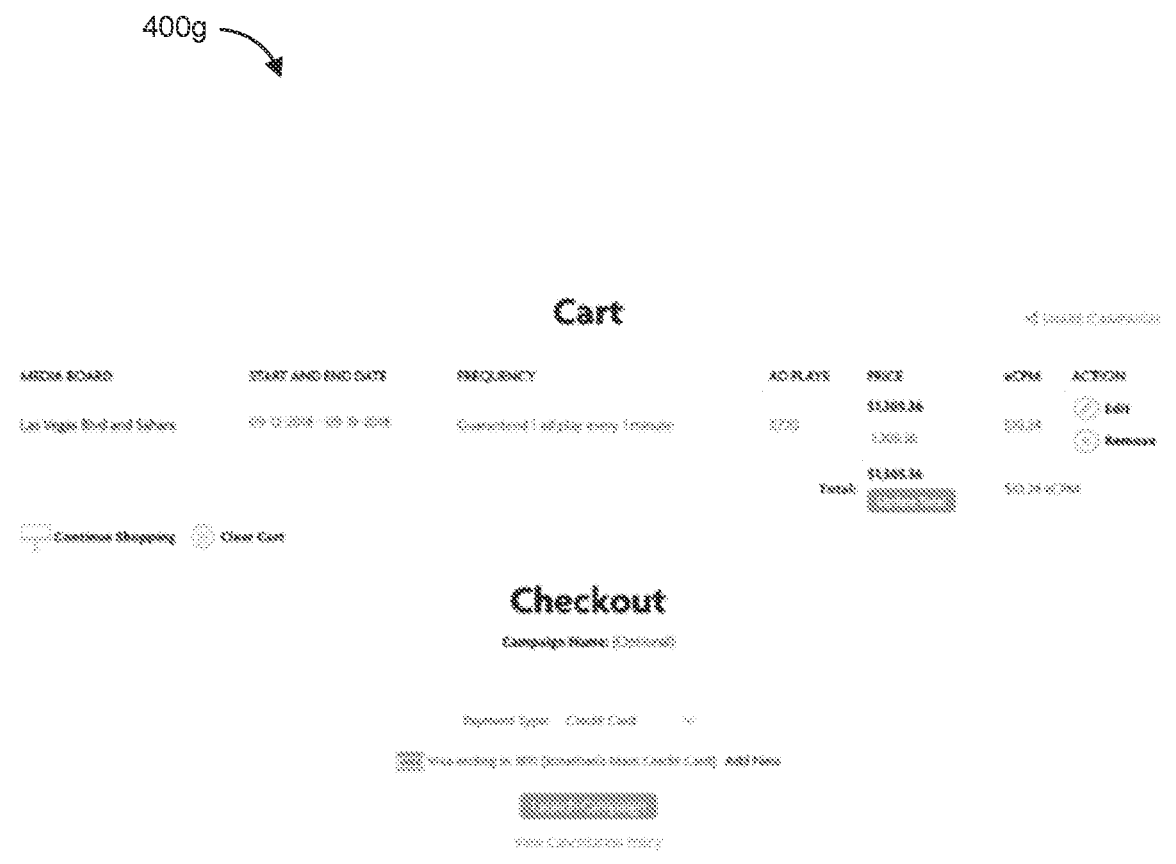

FIG. 4G is a screenshot of a checkout GUI 400g for completing a booking of the advertising panel, consistent with various embodiments. After the advertiser inputs the scheduling information and uploads the ad content, the advertiser can finalize the booking by adding the digital billboard to a shopping cart and completing the checkout process by providing the payment details as illustrated in the checkout GUI.

Figure 5A:
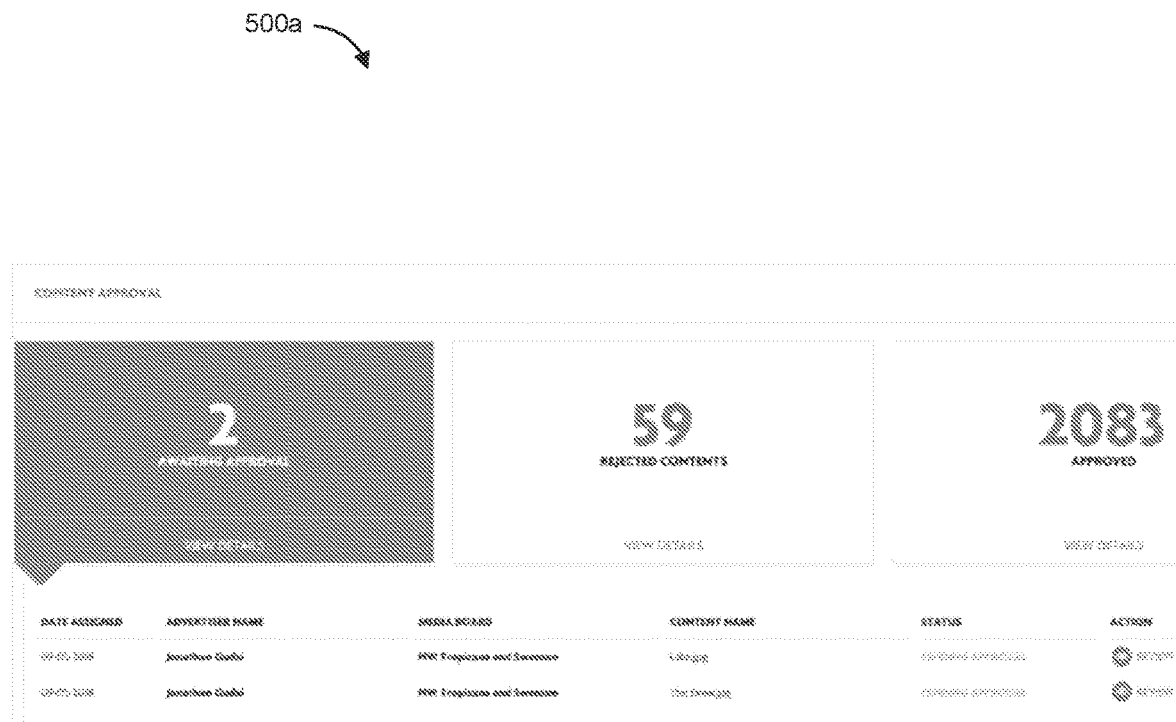
FIG. 5A is a screenshot of an approval dashboard GUI, in accordance with various embodiments.
Figure 5B:
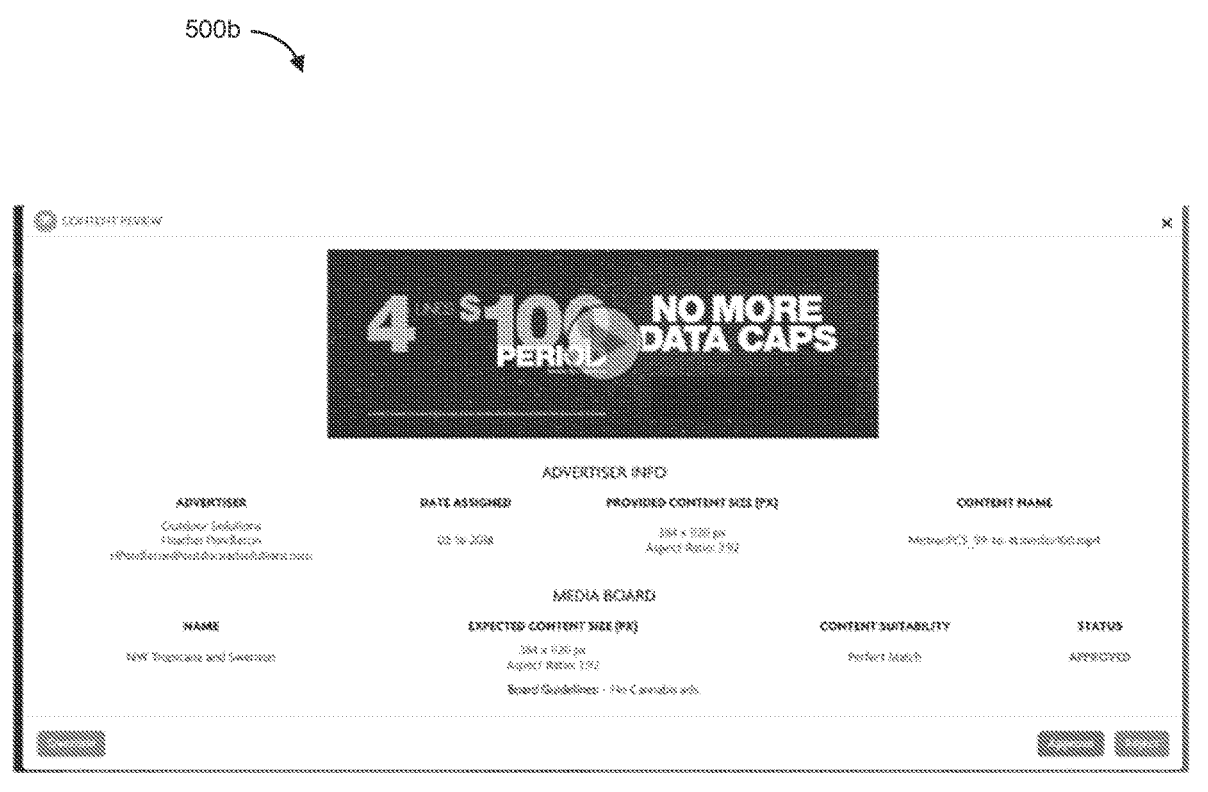

FIG. 5A-5B illustrate an approval GUI. FIG. 5A is a screenshot of an approval dashboard GUI 500a, 500b, in accordance with various embodiments. In some embodiments, the online platform can generate an approval dashboard GUI. Using the approval dashboard GUI, a screen owner (e.g., screen owner), can view approval information such as number of ad content requests awaiting approvals from the screen owner, number of ad content requests approved by the screen owner, and number of ad content requests rejected by the screen owner. The screen owner may view more detailed information regarding rejections or approvals by selecting any of the above information types. For example, by selecting the awaiting approval information, the digital owner can view each of the ad content requests awaiting approval. By clicking on an ad content request, the screen owner may be navigated to an approval GUI, as shown in FIG. 5B.

Figure 6A:
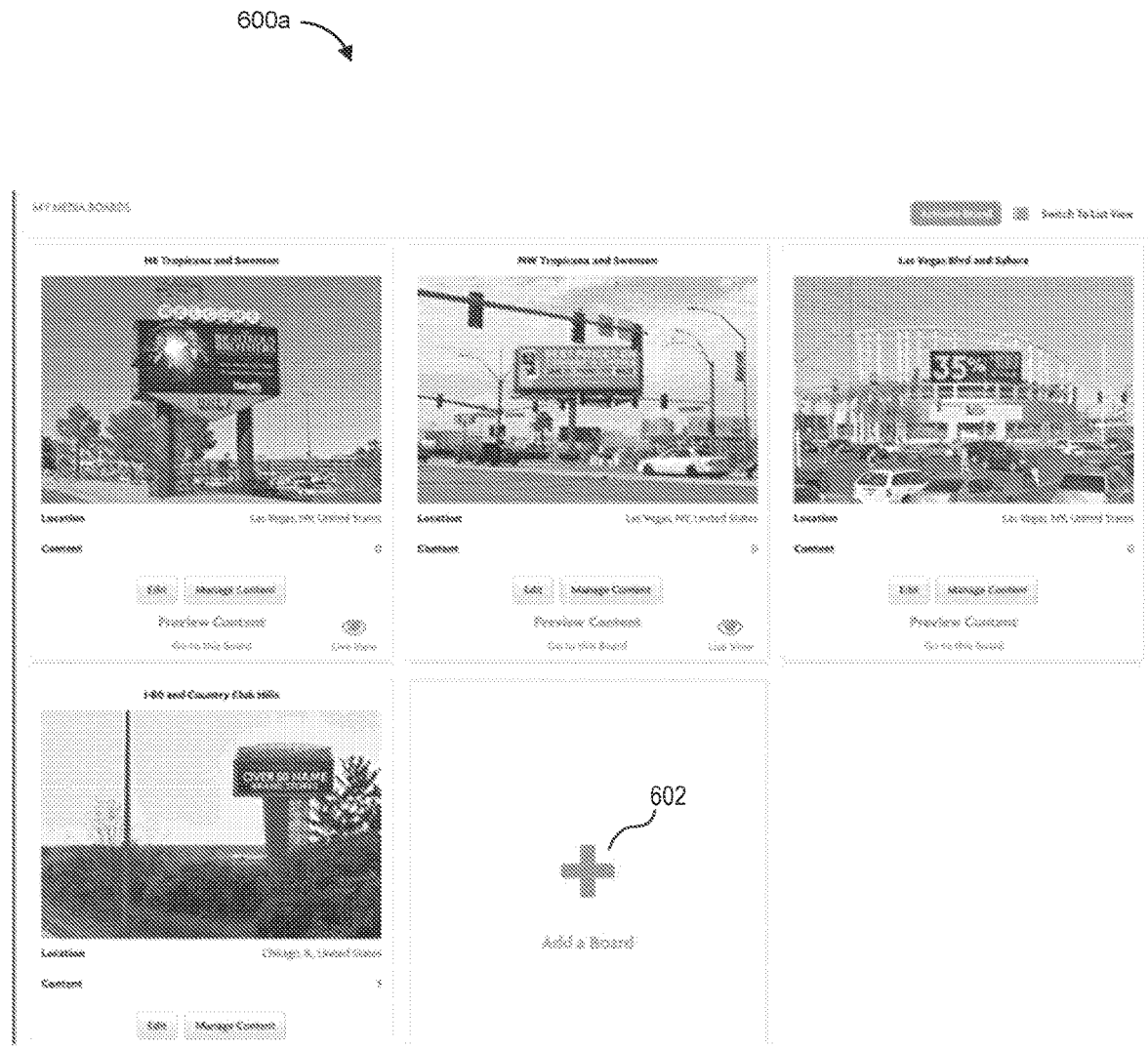
FIG. 6A is a screenshot of an advertising panel dashboard GUI, in accordance with various embodiments.
Figure 6B:
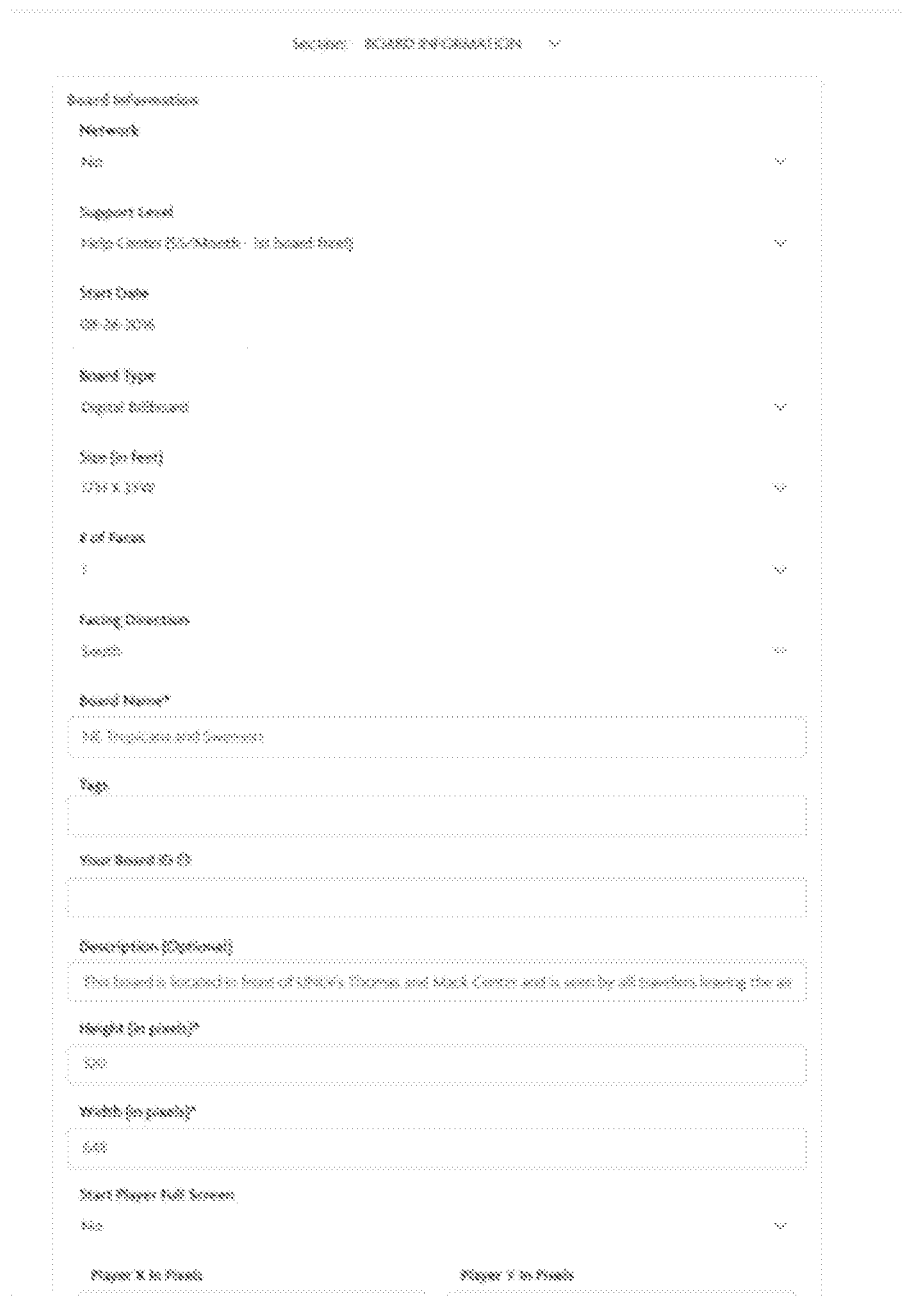
FIG. 6B is a screenshot of an advertising panel settings GUI, in accordance with various embodiments.

FIGS. 6A-6D illustrate various advertising panel dashboard GUIs. FIG. 6A is a screenshot of an advertising panel dashboard GUI 600a, in accordance with various embodiments. In some embodiments, the online platform can generate an advertising panel dashboard GUI 600a. The advertising panel dashboard GUI presents information regarding various advertising panels associated with a screen owner (e.g., the screen owner). The advertising panel dashboard GUI may display all advertising panels that are registered by the screen owner with the online platform. The screen owner can also register (i.e. add) a new advertising panel by using the "add board" GUI element 602 in the advertising panel dashboard GUI. Upon selecting the option to add a new advertising panel, the screen owner may be navigated to an advertising panel settings GUI, as shown in FIG. 6B.

FIG. 6B is a screenshot of an advertising panel settings GUI 600b, in accordance with various embodiments. In some embodiments, the online platform can generate an advertising panel settings GUI. The advertising panel settings GUI allows the screen owner to manage (e.g., view, edit, or set, the settings of the advertising panel to be added to the online platform. Examples of advertising panel information include a type of the advertising panel, dimensions of the advertising panel, name of the advertising panel, and the start date from which the board is available in the online platform.

FIG. 6C is a screenshot of another advertising panel settings GUI 600c, in accordance with various embodiments. In some embodiments, the online platform can generate another advertising panel settings GUI. The advertising panel settings GUI may allow the screen owner to manage the settings of the advertising panel such as loop length, ad duration, slots to be made available for the online platform, and expected monthly revenue through sales from the online platform.

Figure 6D:
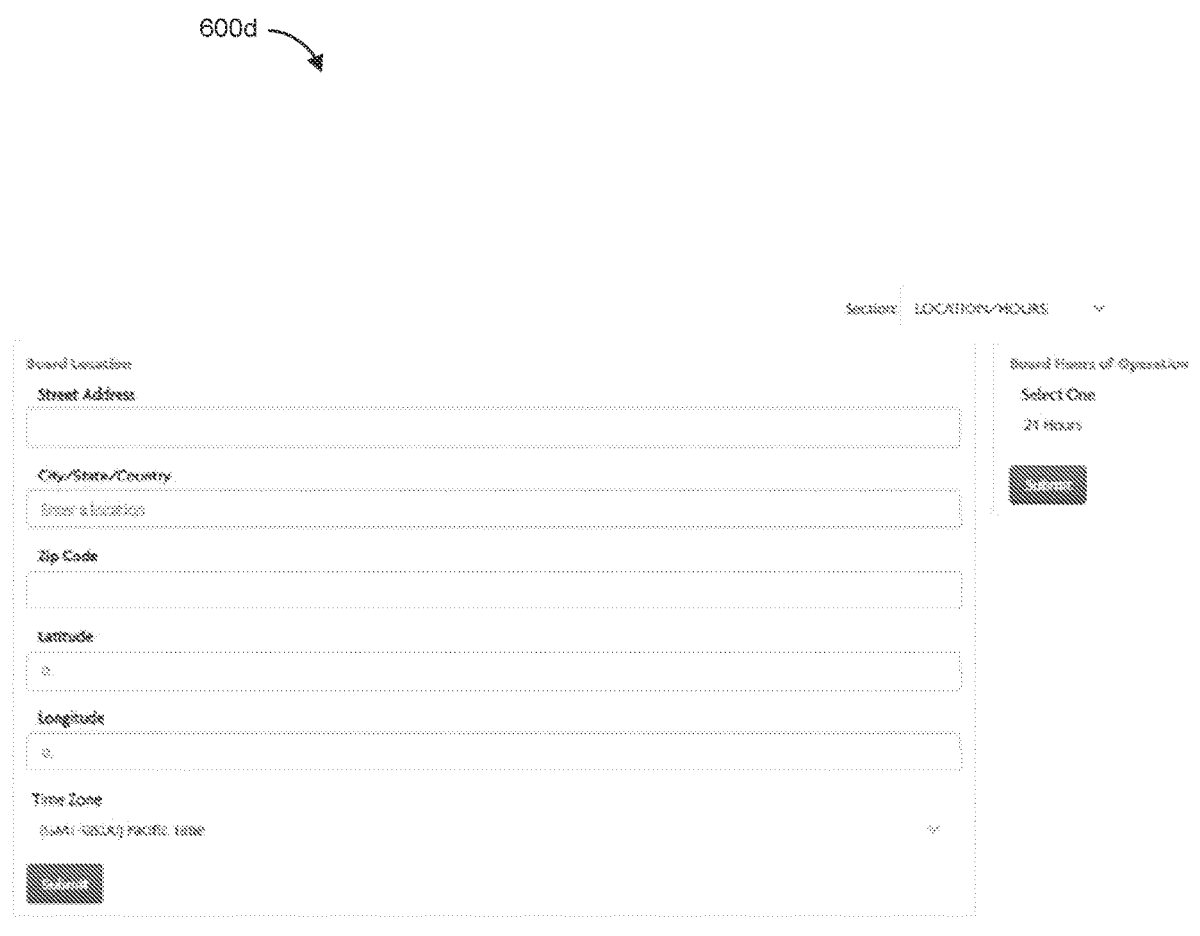

FIG. 6D is a screenshot of another advertising panel settings GUI, in accordance with various embodiments. In some embodiments, the online platform can generate another advertising panel settings GUI. The advertising panel settings GUI allows the screen owner to manage the settings of the advertising panel such as location details and operation hours of the advertising panel. In some embodiments, the screen owner can access the GUIs of FIGS. 6A-6D using a client device associated with the screen owner.

OOH Advertising Medium Management

The server may provide inventory management systems for managing the advertising panels. In a guaranteed scheduling type/inventory management system, the screen owner chooses their loop length and ad duration, which the server can use to determine the number of total slots. The screen owner can choose the number of slots they would like to sell on the online platform. The online platform may facilitate selling and scheduling down to a single ad play for a specific date and time of day from the number of slots.

Some screen owners may not want to manage down to the minute and would rather have a playlist. In a playlist scheduling type, the screen owner may define an ad duration and rotate through all their scheduled content until the online platform gets to the end and then start over. The screen owner can specify what percent of the ad plays they want to sell on the online platform, or the default is to prioritize paid ad plays. Accordingly, if there are a sufficient number of advertisers, the screen owner's content may not play at all.

In some embodiments, the screen owner can create events with a start and an end dates/times and an ad duration. From this, the server can calculate how many ad plays there are that can be sold and what percent the screen owner wants to sell. The server can let the advertiser select one or more events, how many ad plays they want to buy for each event, and schedule content on a per event basis. In some embodiments, the events scheduling type may be most commonly used for sporting events or concerts, the ad plays are listed for sale in a list of events (such as individual baseball games).

The server may include a monitoring component, which can monitor the online platform and alerts the admin user, advertiser and/or the advertising panel owner in case of an occurrence of one or more events. For example, the monitoring component can monitor the working of an advertising panel, and in an event the advertising panel is faulty (e.g., the advertising panel is not working or otherwise not being able to display the ad), the monitoring component can alert any of the admin user, advertising panel owner or the advertisers whose ads are to be displayed on the advertising panel.

The server may include a reporting component that can generate a number of reports for any of an administrative user, advertising panel owner, or the advertiser. In some embodiments, for an advertiser, the reporting component can generate a report such as proof of play, campaign summary, accounting or payments. The proof of play report can include information such as number of ad content played, total number of ad plays, total number of impressions delivered (e.g., number of target audience). The campaign summary can provide information such as total amount spent by the advertiser for the campaigns, total ad time, total number of impressions delivered etc.

For a screen owner, the reporting component can generate reports such as the above reports generated for the advertiser but from the perspective of one or more advertising panels of the screen owner, and other reports such as payouts, collected revenue, license payments, accounting, or occupancy. In some embodiments, the occupancy report can include information such as total number of slots of an advertising panel displaying the ads, a number of slots occupied by the screen owner content, and a number of slots occupied by the advertiser content.

Note that the above reports can be highly customized by the user. For example, the proof of play report can be generated by the advertiser per advertising panel, a set of advertising panels displaying a specific ad, all advertising panels, for a specific day, etc.

The server may include an audience measurement component that can be used to generate audience data (e.g., demographics, interests/behaviors, etc.) for the locations of the advertising panels. Such audience data can be used to help advertisers to plan and buy inventory based on target audience and provide post-campaign reporting on the audience reached. In some embodiments, the server communicates with third-party systems to obtain at least a portion of the audience data. The third-party systems can employ one or more sensors (e.g., near the advertising panels, to obtain the audience data.

In some embodiments, the audience measurement component and/or the third-party systems can obtain audience data using mobile device data. The mobile device data can include location audience data from mobile devices via apps (e.g., first party SDKs) or at exchanges (e.g., bitstream). The location audience data may be combined with census or survey data using the computed home locations of devices.

In some embodiments, the audience measurement component and/or the third-party systems can obtain audience data using cameras. Example information gathered using cameras can include video feed analyzed by software that captures impressions and an ad duration.

In some embodiments, the audience measurement component and/or the third-party systems can obtain audience data using Wi-Fi sniffing that tracks the presence of devices as proxy for headcount and ad duration. The Wi-fi sniffing can capture impressions and ad duration or a frequency of visits.

In some embodiments, the audience measurement component and/or the third-party systems can obtain audience data by the screen owner. Screen owner information can classify the audience based on type of location (e.g., a coffee shop) using information such as a purchase history or other proprietary info from the screen owner. The screen owner information can include a custom taxonomy.

In some embodiments, the audience measurement component and/or the third-party systems can obtain audience data by a census and other public records.

In some embodiments, the audience measurement component and/or the third-party systems can obtain audience data using social media posts tagged with a location. The server may determine behavior and interest using text analysis of social media posts tagged by location, which may give unique insights into behavior personas.

Example audience data attributes that can be determined using the above sources can include demographics (e.g., as age range, gender, ethnicity, family number of children, parent, elderly present in home, empty nester, etc.) homeowner status, household income, job function, length of residence, behavior or interests (e.g., fast casual diners, high-end grocery customer, football fans, brand shoppers, etc.).

In some embodiments, the audience data gleaned from such sources can be used by the server to help the advertisers to buy inventory based on target audience. For example, if the advertisers want to target the ad to audience based on their purchase history (e.g., the server can recommend advertising panels based on the data obtained from screen-owner provided data source). In another example, if the advertisers want to target the ad to audience based on their affluence, the server can recommend advertising panels in locations where cars of one or more brands are seen to be driven more than other locations, which can be determined by analyzing video feed from video cameras installed near the advertising panels for specified brand of cars. In another example, if the advertisers want to target the ad to audience for certain age groups, the server can recommend advertising panels in locations having people of those age groups, which can be determined based on mobile device data and/or census and other public records.

The audience data can be used to score the advertising panels, determine a percentage match (composition of target audience) for a specified advertising panel, sort advertising panels by "Best Match" (e.g. score or percentage match, determine audience weighted cost per mile/thousand (CPM), allow advertiser to specify budget, or target visitor frequency and filtering list of advertising panels accordingly, generate potential reach vs. budget interactive chart, or ability to bulk-select advertising panels (e.g., add to cart) from the search results (e.g., after filtering by audience).

In some embodiments, the scoring/sorting ("scoring") algorithm for generating a score for the advertising panels considers one or more factors, such as location (e.g., state, zip, DMA, custom geofence), selected audience (e.g., demographics, behaviors, interests, brand shoppers), ad play price, budget, frequency of ad play, impressions, CPM (e.g., using ad play price+impressions), ad duration, or visit frequency (e.g. average number of times a visitor had Opportunity To See (OTS) per week).

Mobile Device Advertising Material Display

In some embodiments, the online platform can facilitate the selection of advertisements to be displayed on mobile applications (or 'apps') executing on mobile devices. For example, the advertisers can choose their OOH advertising pane locations and the server may create an exposure area around the OOH advertising panel (e.g., a quarter-mile radius).

The server may tag any mobile devices that pass through the exposure area in the storage system and then deliver ads (e.g., from mobile ad serving partners) as a complement to the larger OOH advertising panels. The advertisers may be able to track performance and generate reports for both the physical OOH advertising panels and the mobile devices.

Figure 7:
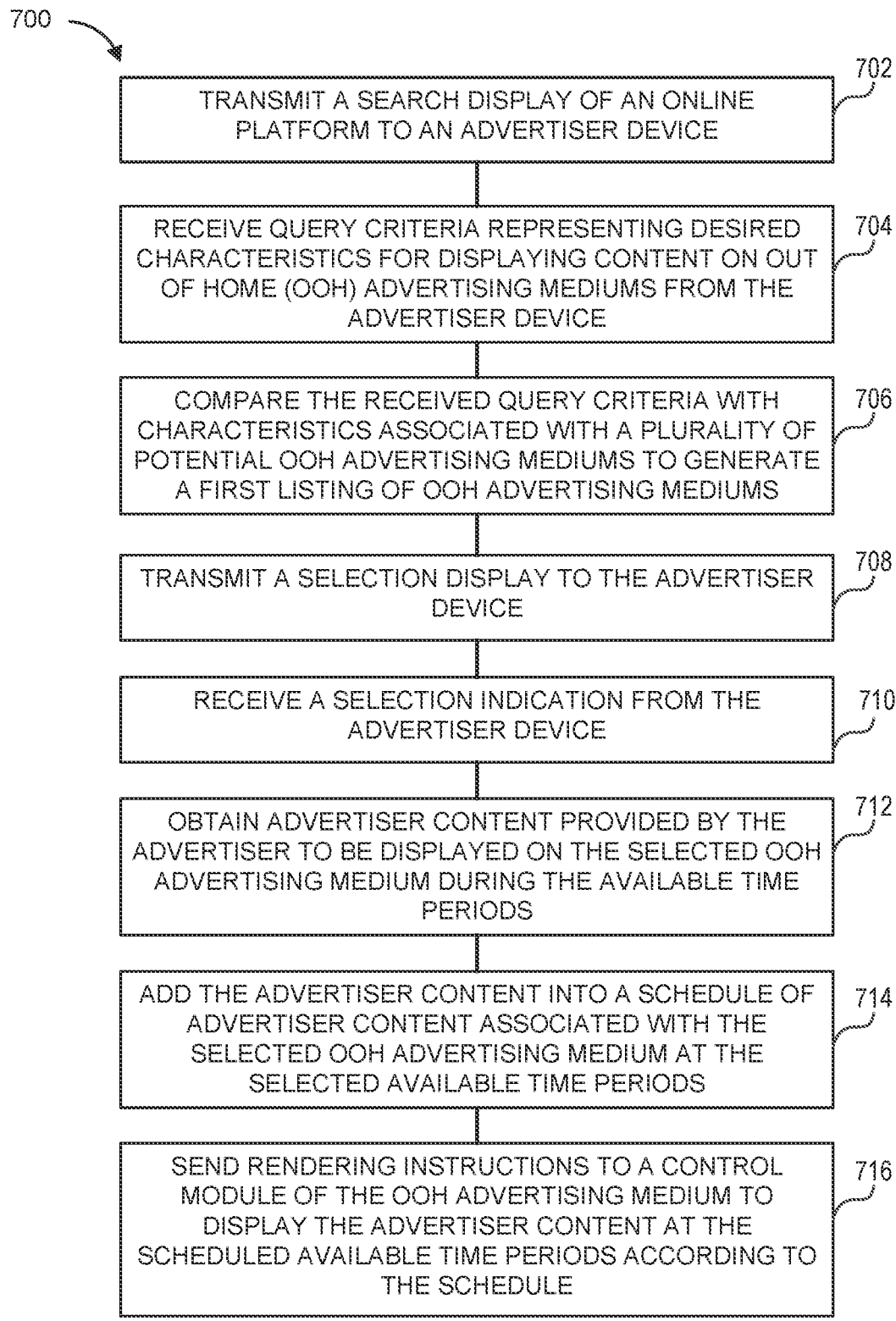
FIG. 7 illustrates a block diagram of a method to implement an online platform, in accordance with various embodiments.

FIG. 7 illustrates a block diagram of a method 700 to implement an online platform, in accordance with various embodiments. A server (e.g., server 102 may generate the online platform and facilities interaction with various devices (e.g., advertiser device 104, OOH advertising medium owner device 106).

The method may include transmitting a search display associated with an online platform to an advertiser device associated with an advertiser (block 702). The search display may include a request for query criteria.

The online platform can be accessed using client devices such as a desktop, a smartphone, or a tablet. Further, the online platform can be implemented in multiple configurations (e.g., as a website), which can be accessed using a web browser application, and/or as an app, which can be installed on client devices such as a smartphone and/or a tablet.

The method may include receiving query criteria representing desired characteristics for displaying content on out of home (OOH) advertising mediums from the advertiser device (block 704). For example, a query criterion can include one or more of a geographical location (e.g., street name, city, state, or zip code) of an advertising panel, a type of the advertising panel (e.g., a digital billboard, an indoor advertising panel, a shopping mall advertising panel, a mobile display, a taxicab advertising panel), or a target audience parameter (e.g., minimum number of target audience, income of target audience, ethnicity, gender, age group).

In some embodiments, the storage system has information regarding all the advertising panels the screen owners have made available to the advertisers for displaying their ads via the online platform.

The method may include comparing the received query criteria with characteristics associated with a plurality of potential OOH advertising mediums to generate a first listing of OOH advertising mediums (block 706). Each of the first listing of OOH advertising mediums may include characteristics that are within a threshold similarity of the query criteria.

In some embodiments, comparing the received query criteria with characteristics associated with a plurality of potential OOH advertising mediums may include determining whether every characteristic value for each of the plurality of potential OOH advertising mediums are within a corresponding query criteria value range associated with each query criteria, and adding any OOH advertising medium to the first listing of OOH advertising mediums when every characteristic value associated with any OOH advertising medium is within the corresponding query criteria value range associated with each query criteria.

The method may include transmitting a selection display to the advertiser device (block 708). In some embodiments, the selection display includes information relating to each of the first listing of OOH advertising mediums and an image of each of the first listing of OOH advertising mediums, a map depicting geographic locations of each of the first listing of OOH advertising mediums, and at least one query criteria modification button configured to modify the query criteria.

The method may include receiving a selection indication from the advertiser device (block 710). The selection indication may provide a selected OOH advertising medium included in the first listing of OOH advertising mediums, an available time period indication indicating selected available time periods of the selected OOH advertising medium, and a value to select the selected available time periods of the selected OOH advertising medium.

The method may include obtaining advertiser content provided by the advertiser to be displayed on the selected OOH advertising medium during the available time periods (block 712).

In some embodiments, the method may include transmitting a plurality of templates to the advertiser device, each template configured to be modified by the advertiser, and receiving a modified version of one of the plurality of templates from the advertiser device, wherein the advertiser content includes the modified template.

The method may include adding the advertiser content into a schedule of advertiser content associated with the selected OOH advertising medium at the selected available time periods (block 714). The value may be reduced by a time period value associated with each of the selected available time periods.

In some embodiments, the server can send an approval notification to the screen owner associated with the digital billboard and to the admin user of the online platform for approving the ad content. The ad content can be approved or rejected by a content approval process.

In some embodiments, the server may retrieve audience information providing audience engagement metrics associated with the selected OOH advertising medium at various time periods from a third party device, determine a time period score associated with each time period for the OOH advertising medium representing audience engagement with the OOH advertising medium at each time period, the time period scores are configured to increase as the audience engagement metrics for each time period increase, and determine the time period value associated with each selected available time period of the selected OOH advertising medium based on time period scores associated with each selected available time period.

In some embodiments, the schedule includes a plurality of previously-selected time periods associated with other advertisers and a number of available time periods that are not associated with any advertiser, wherein the OOH advertising medium is configured to display predetermined advertising content associated with a OOH advertising medium owner if the schedule includes any available time period not associated with any advertiser.

In some embodiments, the method may include receiving a request to display advertiser content on the OOH advertising medium at any available time periods from the advertiser device, wherein the schedule includes a plurality of previously-selected time periods associated with various advertisers and a plurality of available time periods, determining an available time period that includes a time period value that is less than the value, reducing the value by the time period value of the available time period, wherein available time periods are configured to be selected until there are no available time periods that have a time period value less than the value, and updating the schedule to include the advertiser content at the determined available time period.

In some embodiments, the method may include identifying a set of advertiser content characteristics and a set of detected objects in the advertiser content, and comparing the identified set of characteristics and the set of detected objects with a set of rules associated with an owner of the OOH advertising medium to determine whether the identified set of characteristics and the set of detected objects are in accordance with the set of rules, wherein adding the advertiser content into the schedule is based on determining that the identified set of characteristics and the set of detected objects are in accordance with the set of rules.

The method may include sending rendering instructions to a control module of the OOH advertising medium to display the advertiser content at the scheduled available time periods according to the schedule (block 716).

In some embodiments, the server may identify one or more mobile devices associated with consumers that are within a virtual boundary and send rendering instructions to one or more mobile devices that are within the virtual boundary, wherein advertiser content is configured to be displayed on an application executing each of the one or more mobile devices.

In some embodiments, the method may include dividing the advertiser content into multiple parts, wherein each part corresponds to one of multiple electronic panels included in the OOH advertising medium, wherein the rendering instructions instruct the OOH advertising medium to display each part of the advertiser content on a corresponding electronic panel of the OOH advertising medium.

In some embodiments, the method may include receiving an OOH advertising medium addition request from an OOH advertising medium owner device indicating a request to add a new OOH advertising medium to the online platform, identifying information relating to the new OOH advertising medium from the OOH advertising medium addition request, the information relating to the new OOH advertising medium including any of location of the new OOH advertising medium, size of the new OOH advertising medium, and available time periods of the new OOH advertising medium, determining, based on the information relating to the new OOH advertising medium, an available time period value for the available time periods of the new OOH advertising medium, and adding the new OOH advertising medium to the plurality of potential OOH advertising mediums.

Example Processing System

Figure 8:
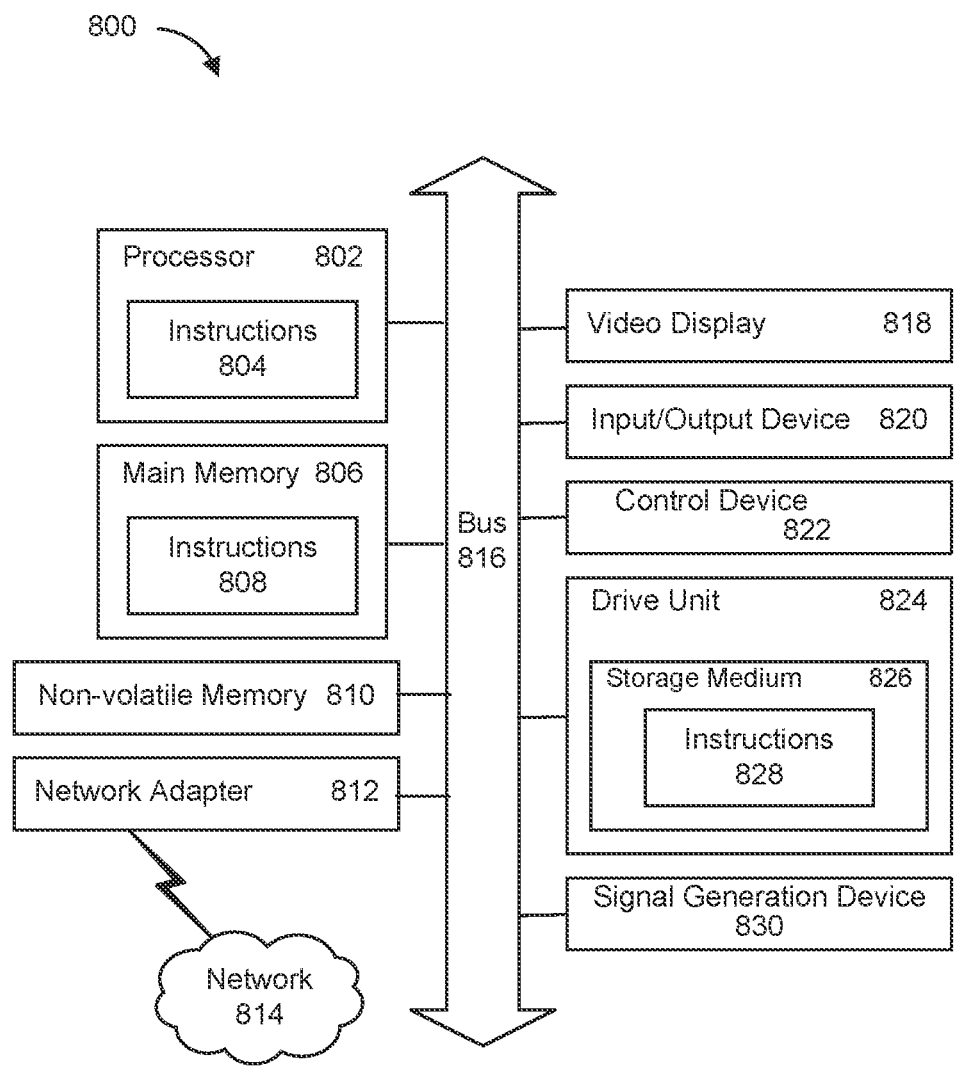
FIG. 8 is a block diagram that illustrates an example of a processing system in which at least some operations described herein can be implemented.

FIG. 8 is a block diagram illustrating an example of a processing system 800 in which at least some operations described herein can be implemented. As shown in FIG. 8, the processing system 800 may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1384 bus, also called "Firewire."

In various embodiments, the processing system 800 operates as part of a user device, although the processing system 800 may also be connected (e.g., wired or wirelessly) to the user device. In a networked deployment, the processing system 800 may operate in the capacity of a server or a client machine in a client-server network environment, or as a peer machine in a peer-to-peer (or distributed) network environment.

The processing system 800 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 800.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:
1. A computer-implemented method comprising:
obtaining, by a server, advertiser content provided by a first advertiser to be displayed on a digital out-of-home (OOH) display, wherein the digital OOH display includes a control module communicatively coupled to the server over a network;
selecting, by the server, an available time period to display the advertiser;
adding the advertiser content provided by the first advertiser into a schedule of advertiser content associated with the digital OOH display at the selected available time period;
sending, by the server over the network, rendering instructions to the control module of the digital OOH display, the rendering instructions configured to cause the control module to render the advertiser content provided by the first advertiser on the digital OOH display at the selected available time period;
assigning a first weight to the advertiser content provided by the first advertiser and a second weight to advertiser content provided by a second advertiser,
wherein the first and second weights are determined based on a first number of ad plays associated with the advertiser content provided by the first advertiser and a second number of ad plays associated with the advertiser content provided by the second advertiser, respectively;
randomly selecting, based on the first and second weights, either the advertiser content provided by the first advertiser or the advertiser content provided by the second advertiser; and
causing, during an unscheduled time period, the control module to initiate display of the randomly selected advertiser content on the digital OOH display.

2. The computer-implemented method of claim 1, wherein the first weight is determined further based on at least one of: a budget distribution among multiple digital OOH displays, hours of operation of the digital OOH display, or a historic number of ad plays associated with the digital OOH display.

3. The computer-implemented method of claim 1, further comprising:
modifying the first weight based on at least one of: a time of day, a number of consumers viewing the digital OOH display, or a size of the digital OOH display.

4. The computer-implemented method of claim 1, wherein the advertiser content is provided by the first advertiser is associated with a geofence area, the method further comprising:
 determining whether a location of the digital OOH display is within the geofence area,
 wherein the advertiser content provided by the first advertiser is displayed in response to determining the digital OOH display is within the geofence area.

5. The computer-implemented method of claim 4, wherein the digital OOH display is carried by a vehicle, and wherein the location of the digital OOH display is determined based on global positioning system (GPS) data received from the digital OOH display.

6. The computer-implemented method of claim 1, further comprising:
 periodically calculating a first number of times the advertiser content provided by the first advertiser has been played and a second number of times the advertiser content provided by the first advertiser has been played; and
 adjusting the first weight and the second weight based on both the first number and the second number.

7. The computer-implemented method of claim 1, wherein the advertising content provided by the first advertiser comprises multiple pieces of content, and wherein the multiple pieces of content are stitched across multiple digital OOH displays.

8. The computer-implemented method of claim 1, further comprising:
 identifying, by the server, one or more mobile devices associated with consumers that are within a virtual boundary surrounding the digital OOH display; and
 sending, by the server, the rendering instructions to the one or more mobile devices that are within the virtual boundary, wherein the advertiser content provided by the first advertiser is configured to be displayed on an application executing on each of the one or more mobile devices.

9. A computing system comprising a processor and a memory storing instructions, execution of which by the processor causes the computing system to:
 obtain advertiser content provided by a first advertiser to be displayed on a digital out-of-home (OOH) display, wherein the digital OOH display includes a control module communicatively coupled to the computing system over a network;
 select an available time period to display the advertiser;
 add the advertiser content provided by the first advertiser into a schedule of advertiser content associated with the digital OOH display at the selected available time period;
 send, over the network, rendering instructions to the control module of the digital OOH display, the rendering instructions configured to cause the control module to render the advertiser content provided by the first advertiser on the digital OOH display at the selected available time period;
 assign a first weight to the advertiser content provided by the first advertiser and a second weight to advertiser content provided by a second advertiser,
 wherein the first and second weights are determined based on a first number of ad plays associated with the advertiser content provided by the first advertiser and a second number of ad plays associated with the advertiser content provided by the second advertiser, respectively;
 randomly select, based on the first and second weights, either the advertiser content provided by the first advertiser or the advertiser content provided by the second advertiser; and
 cause, during an unscheduled time period, the control module to initiate display of the randomly selected advertiser content on the digital OOH display.

10. The computing system of claim 9, wherein the first weight is determined further based on at least one of: a budget distribution among multiple digital OOH displays, hours of operation of the digital OOH display, or a historic number of ad plays associated with the digital OOH display.

11. The computing system of claim 9, further caused to:
 modify the first weight based on at least one of: a time of day, a number of consumers viewing the digital OOH display, or a size of the digital OOH display.

12. The computing system of claim 9, computing system further caused to:
 determine whether a location of the digital OOH display is within a geofence area associated with the advertiser content provided by the first advertiser,
 wherein the advertiser content provided by the first advertiser is displayed in response to a determination that the digital OOH display is within the geofence area.

13. The computing system of claim 12, wherein the digital OOH display is carried by a vehicle, and wherein the location of the digital OOH display is determined based on global positioning system (GPS) data received from the digital OOH display.

14. The computing system of claim 9, further caused to:
 periodically calculate a first number of times the advertiser content provided by the first advertiser has been played and a second number of times the advertiser content provided by the first advertiser has been played; and
 adjust the first weight and the second weight based on both the first number and the second number.

15. The computing system of claim 9, wherein the advertising content provided by the first advertiser comprises multiple pieces of content, and wherein the multiple pieces of content are stitched across multiple digital OOH displays.

16. The computing system of claim 9, further caused to:
 identify one or more mobile devices associated with consumers that are within a virtual boundary surrounding the digital OOH display; and
 send the rendering instructions to the one or more mobile devices that are within the virtual boundary, wherein the advertiser content provided by the first advertiser is configured to be displayed on an application executing on each of the one or more mobile devices.

17. A non-transitory computer-readable medium storing instructions, execution of which by a processor of a computing system causes the computing system to:
 obtain advertiser content provided by a first advertiser to be displayed on a digital out-of-home (OOH) display, wherein the digital OOH display includes a control module communicatively coupled to the computing system over a network;
 select an available time period to display the advertiser;
 add the advertiser content provided by the first advertiser into a schedule of advertiser content associated with the digital OOH display at the selected available time period;
 send, over the network, rendering instructions to the control module of the digital OOH display, the rendering instructions configured to cause the control module to render the advertiser content provided by the first advertiser on the digital OOH display at the selected available time period;

assign a first weight to the advertiser content provided by the first advertiser and a second weight to advertiser content provided by a second advertiser, wherein the first and second weights are determined based on a first number of ad plays associated with the advertiser content provided by the first advertiser and a second number of ad plays associated with the advertiser content provided by the second advertiser, respectively;

randomly select, based on the first and second weights, either the advertiser content provided by the first advertiser or the advertiser content provided by the second advertiser; and cause, during an unscheduled time period, the control module to initiate display of the randomly selected advertiser content on the digital OOH display.

18. The non-transitory computer-readable medium of claim 17, wherein the computing system is further caused to:

determine whether a location of the digital OOH display is within a geofence area associated with the advertiser content provided by the first advertiser, wherein the advertiser content provided by the first advertiser is displayed in response to a determination that the digital OOH display is within the geofence area.

19. The non-transitory computer-readable medium of claim 18, wherein the digital OOH display is carried by a vehicle, and wherein the location of the digital OOH display is determined based on global positioning system (GPS) data received from the digital OOH display.

20. The non-transitory computer-readable medium of claim 17, wherein the computing system is further caused to:

periodically calculate a first number of times the advertiser content provided by the first advertiser has been played and a second number of times the advertiser content provided by the first advertiser has been played; and adjust the first weight and the second weight based on both the first number and the second number.

* * * * *